US012060781B2

(12) United States Patent
Kaur et al.

(10) Patent No.: US 12,060,781 B2
(45) Date of Patent: Aug. 13, 2024

(54) METHOD FOR GENERATING INITIAL MODELS FOR LEAST SQUARES MIGRATION USING DEEP NEURAL NETWORKS

(71) Applicant: ExxonMobil Technology and Engineering Company, Spring, TX (US)

(72) Inventors: Harpreet Kaur, Austin, TX (US); Junzhe Sun, San Jose, CA (US); Mehdi Aharchaou, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 626 days.

(21) Appl. No.: 17/247,608

(22) Filed: Dec. 17, 2020

(65) Prior Publication Data

US 2021/0262329 A1 Aug. 26, 2021

Related U.S. Application Data

(60) Provisional application No. 62/979,158, filed on Feb. 20, 2020.

(51) Int. Cl.
*E21B 43/16* (2006.01)
*G01V 1/28* (2006.01)
(Continued)

(52) U.S. Cl.
CPC .............. *E21B 43/16* (2013.01); *G01V 1/282* (2013.01); *G01V 1/301* (2013.01); *G01V 20/00* (2024.01);
(Continued)

(58) Field of Classification Search
CPC ...... E21B 43/16; E21B 2200/20; G01V 1/282; G01V 1/301; G01V 99/005; G01V 1/303; G01V 2210/51; G01V 2210/624
See application file for complete search history.

(56) References Cited

U.S. PATENT DOCUMENTS 8,983,779 B2  3/2015  Liu et al.
9,002,651 B2  4/2015  Liu et al.
(Continued)

FOREIGN PATENT DOCUMENTS

WO  WO-2019055562 A1 *  3/2019  ............. G01V 1/301
WO     2019182564 A1     9/2019

OTHER PUBLICATIONS

Xiyan Liu et al., Semantic Image Synthesis via Conditional Cycle-Generative Adversarial Networks, Aug. 20-24, 2018, 2018 24th International Conference on Pattern Recognition (ICPR) Beijing, China, IEEE, pp. 988-993. (Year: 2018).*

(Continued)

*Primary Examiner* — Mischita L Henson
(74) *Attorney, Agent, or Firm* — ExxonMobil Technology and Engineering Company—Law Department (57) ABSTRACT

A method and apparatus for generating a high-resolution seismic image, including extracting a reflectivity distribution from a geological model; utilizing the reflectivity distribution to label features of the model; generating forward-modeled data from the model; migrating the forward-modeled data to create a migrated image; and training a deep neural network with the labeled synthetic geological model and the migrated image to create a reflectivity prediction network. A method and apparatus includes: selecting a first subset of the field data; applying a low-pass filter to the first subset to generate a first filtered dataset; migrating the first filtered dataset to create a first migrated image; applying a high-pass filter to the first subset to generate a second filtered (Continued)

dataset; migrating the second filtered dataset to create a second migrated image; and training a deep neural network to predict a target distribution of high-frequency signal.

20 Claims, 8 Drawing Sheets

(51) Int. Cl.
*G01V 1/30* (2006.01)
*G01V 20/00* (2024.01)
*G06N 3/08* (2023.01)

(52) U.S. Cl.
CPC ............ *G06N 3/08* (2013.01); *E21B 2200/20* (2020.05); *E21B 2200/22* (2020.05); *G01V 1/303* (2013.01); *G01V 2210/51* (2013.01); *G01V 2210/624* (2013.01)

(56) References Cited

U.S. PATENT DOCUMENTS

| | | | |
|---|---|---|---|
| 9,063,248 B2 | 6/2015 | Liu et al. | |
| 9,291,734 B2 | 3/2016 | Liu et al. | |
| 9,291,735 B2 | 3/2016 | Lu et al. | |
| 10,088,588 B2 | 10/2018 | Zhang et al. | |
| 10,191,168 B2 | 1/2019 | Peng et al. | |
| 10,295,683 B2 | 5/2019 | Du et al. | |
| 10,324,207 B2 | 6/2019 | Khalil et al. | |
| 10,436,927 B2 | 10/2019 | Sun et al. | |
| 10,520,619 B2 | 12/2019 | Yang et al. | |
| 10,670,751 B2 | 6/2020 | Qin et al. | |
| 10,725,190 B2 | 7/2020 | Gratacos et al. | |
| 10,739,478 B2 | 8/2020 | Coates et al. | |
| 2012/0051180 A1 | 3/2012 | Shin | |
| 2013/0185032 A1 | 7/2013 | Archer et al. | |
| 2015/0293246 A1 | 10/2015 | Dickens et al. | |
| 2018/0156931 A1 | 6/2018 | Ahmed | |
| 2018/0156933 A1 | 6/2018 | Ahmed | |
| 2018/0275302 A1 | 9/2018 | Calderon et al. | |
| 2019/0179047 A1* | 6/2019 | Kim | G01V 1/30 |
| 2019/0302293 A1 | 10/2019 | Zhang et al. | |
| 2020/0040709 A1* | 2/2020 | McAdow | G01V 1/282 |
| 2020/0183031 A1* | 6/2020 | Denli | G01V 1/301 |
| 2021/0215824 A1* | 7/2021 | Bai | G01V 1/301 |
| 2021/0247534 A1* | 8/2021 | Bø | G06N 3/08 |
| 2023/0032044 A1* | 2/2023 | Li | G01V 1/282 |

OTHER PUBLICATIONS

Tiantong Guo et al., Deep Wavelet Prediction for Image Super-resolution, 2017, 2017 IEEE Conference on Computer Vision and Pattern Recognition Workshops, pp. 1100-1109 (Year: 2017).*

Claerbout, J. F., and Black, J. L. (2001) "Basic Earth Imaging", version 2.4, Chapter 2—pp. 11-22, and Chapter 4—pp. 41-58.

Mirza, M. and Osindero, S. (2014) "Conditional generative adversarial nets", arXiv preprint arXiv:1411.1784, 7 pgs.

Nemeth, T. et al., (1999) "Least-squares migration of incomplete reflection data", Geophysics, vol. 64, No. 1, pp. 208-221.

Prucha, M. L. et al. (1999) "Angle-domain common image gathers by wave-equation migration". 69th Annual International Meeting, SEG, Expanded Abstracts, pp. 824-827.

Rickett, J. E. (2003) "Illumination-based normalization for wave-equation depth migration", Geophysics, vol. 68, No. 4, pp. 1371-1379.

Wang, P. et al. (2016) "Least-squares RTM: Reality and possibilities for subsalt imaging", 86th Annual International Meeting, SEG, Expanded Abstracts, pp. 4204-4209.

Xu, Zhen et al. (2018) "A cost-efficient controlled reverse time migration", 88th Annual International Meeting, SEG, Expanded Abstracts, pp. 4286-4290.

Zhu, Jun-Yan et al. (2017) "Unpaired Image-to-Image Translation using Cycle-Consistent Adversarial Networks", Proceedings of the 2017 IEEE International Conference on Computer Vision, pp. 2242-2251.

* cited by examiner

METHOD FOR GENERATING INITIAL MODELS FOR LEAST SQUARES MIGRATION USING DEEP NEURAL NETWORKS

CROSS REFERENCE TO RELATED APPLICATION

This application claims the benefit of priority of U.S. Provisional Application No. 62/979,158, filed Feb. 20, 2020, the disclosure of which is incorporated herein by reference in its entirety.

FIELD

This disclosure relates generally to the field of geophysical prospecting and, more particularly, to prospecting for hydrocarbon and related data processing. Specifically, exemplary embodiments relate to methods and apparatus for improving computational efficiency by using deep neural networks to generate initial models for least-squares migration.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of geophysical prospecting is to accurately detect, locate, identify, model, and/or quantify subsurface structures and likelihood of hydrocarbon occurrence. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is delivered/propagated into the earth. Seismic waves are reflected from subsurface structures and are received by a number of seismic sensors or "receivers" (e.g., geophones). The seismic data received by the seismic sensors is processed in an effort to create an accurate mapping (e.g., an image and/or images of maps, such as 2-D or 3-D images presented on a display) of the subsurface region. The processed data is then examined (e.g., analysis of images from the mapping) with a goal of identifying geological structures that may contain hydrocarbons.

A goal of seismic data processing is to generate a high-resolution image of the reflectivity of the Earth's subsurface structure. Often, inversion techniques may be used to generate such reflectivity images. Inversion generally involves geophysical methods to estimate subsurface properties (such as velocity or density). Typically, inversion begins by using a starting subsurface physical properties model to generate synthetic seismic data (e.g., by solving a wave equation using a numerical scheme). The synthetic seismic data are compared with the field seismic data. Based on the comparison, differences are identified between the synthetic seismic data and the field seismic data. Based on the differences, the value of an objective function is calculated. A modified subsurface model is then generated to reduce or minimize the objective function. The modified subsurface model is then used to simulate a new set of synthetic seismic data. This new set of synthetic seismic data is compared with the field data to recalculate the value of the objective function. An objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and/or to update the subsurface model.

High-resolution images are especially important for unconventional reservoir characterization and/or to detect small-scale geological features that may influence the hydrocarbon production efficiency. However, many imaging algorithms (such as reverse time migration (RTM)) use the adjoint of the forward-modeling operator to estimate the subsurface model. Such imaging algorithms are unable to fully reverse seismic wave propagation effects (Claerbout and Black, 2001; Rickett, 2003). Hence, standard depth migration algorithms often suffer from low resolution, uneven amplitude, limited bandwidth, and/or migration artifacts.

Least-squares migration (LSM) with regularization has proven to be effective with incomplete surface data and irregular illumination due to complex sub-surface structures (Nemeth et al., 1999, Prucha et al., 1999). A limitation of LSM with conventional implementations is that the cost can be more than an order of magnitude of the costs of the corresponding migration. In addition, the cost of RTM scales to the fourth-power of the relative frequency. Consequently, with the use of high frequencies in the data, RTM costs may dramatically increase, which further increases the total cost of least-squares reverse time migration (LS-RTM) (Xu et al., 2018).

LSM has an advantage over the conventional migration in that LSM can mitigate the migration artifacts associated with irregular source-receiver geometry and/or uneven illumination of the subsurface due to strong velocity contrasts. Hence, LSM can provide images with better balanced illumination and more interpretable seismic amplitudes.

LSM is typically applied in either the data domain or the model domain. The model domain approach circumvents the iterative inversion process and approximates the Hessian matrix using single iteration methods, but with limited recovery. Alternatively, the data domain approach requires more migration iterations to solve the inversion problem, which can be impractical for real data applications without any preconditioning (Wang et al., 2016).

LSM can be inefficient and expensive, involving many (e.g., tens or hundreds of) iterations, thousands of clusters of processors, and/or many months of computing time to attain a solution. A more efficient LSM method would be beneficial to improve the resolution of migrated images, to balance the amplitudes, to attenuate migration artifacts, and/or to provide an accurate starting model to significantly reduce the number of iterations involved for the conventional LSM to achieve convergence.

SUMMARY

In one or more embodiments, a method of generating a high-resolution seismic image includes creating a synthetic geological model; extracting a reflectivity distribution from the synthetic geological model; utilizing the reflectivity distribution to label one or more features of the synthetic geological model; generating forward-modeled data from the synthetic geological model; migrating the forward-modeled data to create a migrated image; and training a deep neural network with the labeled synthetic geological model and the migrated image to create a reflectivity prediction network that maps an input migrated image to an estimate of true reflectivity.

In one or more embodiments, a method of generating a high-resolution seismic image includes: obtaining field data; selecting a first subset of the field data; applying a low-pass filter to the first subset to generate a first filtered dataset; migrating the first filtered dataset to create a first migrated image; applying a high-pass filter to the first subset to generate a second filtered dataset; migrating the second filtered dataset to create a second migrated image; and training a deep neural network to predict a target distribution of high-frequency signal by mapping the first migrated image to the second migrated image.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity, and/or acceleration, pressure, reflection, shear, and/or refraction wave data. "Seismic data" is also intended to include any data or properties, including geophysical properties such as one or more of: elastic properties (e.g., P and/or S wave velocity, P-Impedance, S-Impedance, density, attenuation, anisotropy, and the like); seismic stacks (e.g., seismic angle stacks); compressional velocity models; and porosity, permeability, or the like, that the ordinarily skilled artisan at the time of this disclosure will recognize may be inferred or otherwise derived from such data received and/or recorded as part of the seismic surveying process. Thus, the disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly includes seismic data, as well as other data obtained from non-seismic geophysical methods such as electrical resistivity.

As would be understood by one of ordinary skill in the art with the benefit of this disclosure, a variety of inversion techniques may be applicable herein. For example, Full Waveform Inversion (FWI) may produce the elastic parameters (for example, p-wave velocity Vp, the ratio of p-wave velocity to s-wave velocity Vp/Vs, and/or p-wave impedance Ip).

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geological model (particularly a model represented in image form) may be represented in volume elements (voxels), in a similar way that a photograph (or 2-D geological model) is represented by picture elements (pixels). Such numerical representations may be shape-based or functional forms in addition to, or in lieu of, cell-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

In complex geological formations, equation migration is recognized to be an important technique for imaging seismic data. Equation migration generally comes in two forms, usually called WEM and RTM. In WEM (Wave Equation Migration), energy is back-propagated from the seismic receivers using a one-way wave equation, and forward-propagated from the corresponding seismic source. The wavefields are cross-correlated at image points to create the subsurface image. WEM can produce good images for reflectors with relatively shallow dip angle (the angle between a planar subsurface feature and a horizontal plane). In RTM (Reverse Time Migration), the wavefield at the seismic receivers is back-propagated using a two-way wave equation, and cross-correlated with energy forward-propagated from the source. RTM can produce good images at all reflector dips, but may be more expensive than WEM by a factor typically in the range of 4 to 10.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries. For example, a seismic survey may be conducted to acquire the initial data (noting that these and other embodiments may also or instead include obtaining other geophysical data in addition to, or instead of, seismic data—such as obtaining electrical resistivity measurements). In these and other embodiments, models may be utilized to generate synthetic initial data (e.g., computer simulation). In some embodiments, the initial data may be obtained from a library of data from previous seismic surveys or previous computer simulations. In some embodiments, a combination of any two or more of these methods may be utilized to generate the initial data.

As used herein, a "gather" refers to a display of seismic traces that share an acquisition parameter. For example, a common midpoint gather contains traces having a common midpoint with different spacing between a source and a receiver (so called "offset"), while a common shot gather contains traces having a common shot.

As used herein, "high-resolution imaging" generally refers to imaging with seismic data having high frequencies (e.g., about 40 Hz to about 80 Hz, or about 40 Hz to about 150 Hz, or even up to about 500 Hz or higher). Typically, high-resolution images are defined on a denser grid compared with conventional images. Consequently, high-resolution imaging is able to resolve finer features with shorter wavelengths, which generally cannot be imaged using longer wavelengths.

The term "label" generally refers to identifications and/or assessments of correct or true outputs provided for a given set of inputs. Labels may be of any of a variety of formats, including text labels, data tags (e.g., binary value tags), pixel attribute adjustments (e.g., color highlighting), n-tuple label (e.g., concatenation and/or array of two or more labels), etc.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that the time, resources, and/or costs associated with high-resolution imaging may be reduced. Another potential advantage includes improvements to conventional least-squares migration (LSM) methods by utilizing an improved initial model to reduce the number of iterations needed for convergence. Embodiments of the present disclosure can thereby be useful in the discovery and/or extraction of hydrocarbons from subsurface formations.

In some embodiments, a conventional LSM method may be improved by identifying a relationship between the migrated image and true reflectivity. For example, one or more deep neural networks may be trained to identify relationships between migrated images and true reflectivity, thereby creating a reflectivity prediction network. In some embodiments, the identified relationship may be represented and/or quantified in the form of stored weights on test data. The reflectivity prediction network may then be used to improve the illumination of reflectors, reduce migration artifacts, and/or obtain more balanced amplitudes in a model of the subsurface. Thus, an output of the reflectivity prediction network may serve as an initial model for conventional LSM to reduce the number of iterations needed for convergence.

In some embodiments, a conventional LSM method may be improved by identifying a mapping from a low-frequency (e.g., about 20 Hz to about 40 Hz) image volume to a high-frequency (e.g., about 40 Hz to about 80 Hz) image volume. For example, one or more deep neural networks may be trained to identify mappings from low-frequency image volumes to high-frequency image volumes, thereby creating a high-frequency prediction network. The high-frequency prediction network may be then used to improve the resolution of the migrated image.

In some embodiments, a high-frequency prediction network may be utilized in conjunction with a reflectivity prediction network. The output of the combined deep neural network may have a higher spectral bandwidth (e.g., about 40 Hz to about 80 Hz) than a conventional LSM (e.g., about 20 Hz to about 40 Hz). The output of the combined deep neural network may serve as an initial model for high-resolution LSM. With an improved initial model, high-resolution LSM may operate with a reduced number of iterations, therefore significantly reducing the computational cost and/or improving computational efficiency.

In some embodiments, the reflectivity prediction network can be used standalone (i.e., without a high-frequency prediction network) to provide an initial model for conventional LSM. In some embodiments, the reflectivity prediction network may be combined with the high-frequency prediction network to provide an initial model for high-resolution LSM (provided that the added spectral bandwidth is supported in the observed data).

Figure 1:
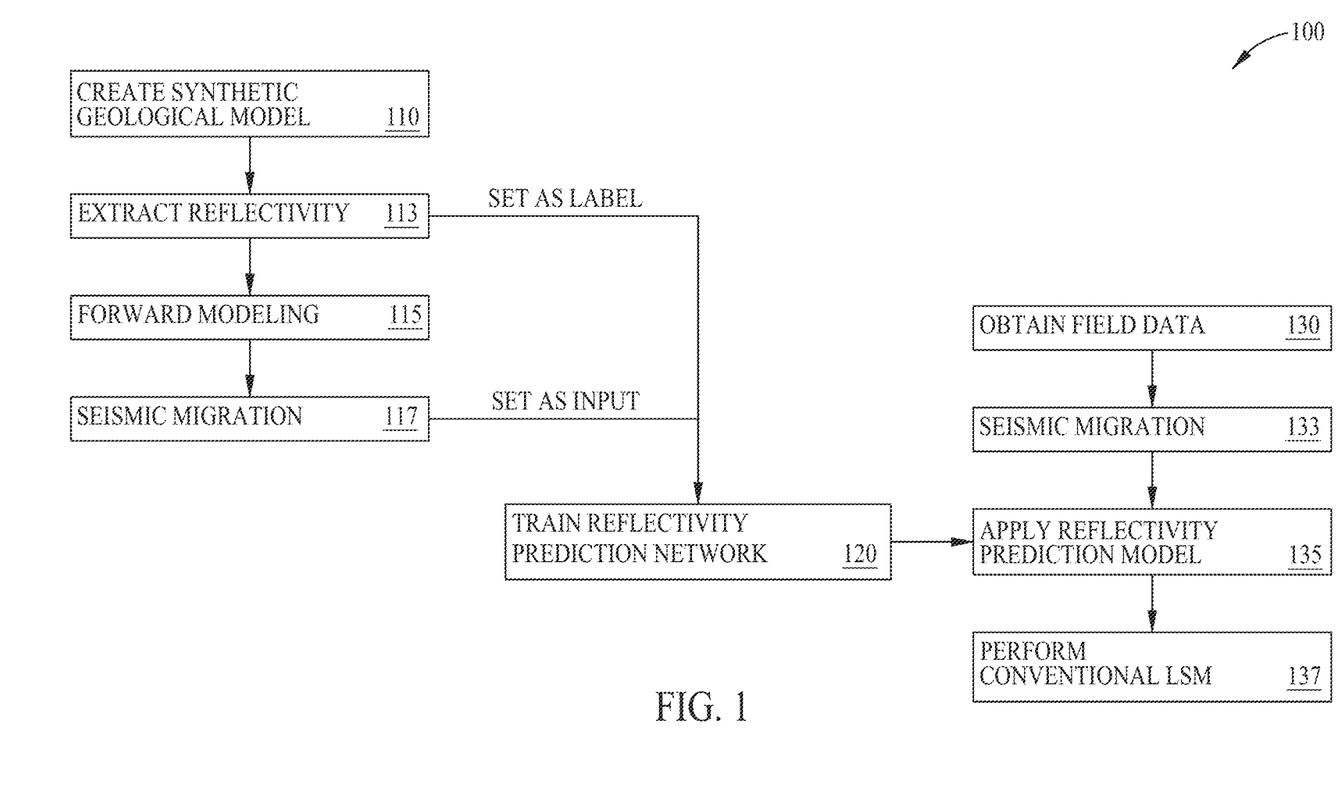
FIG. 1 illustrates an exemplary method for implementing a reflectivity prediction network.

FIG. 1 illustrates an exemplary method 100 for generating a high-resolution seismic image by implementing a reflectivity prediction network. Method 100 begins at block 110 with creation of a synthetic geological model (e.g., representative of a subsurface volume) for a specific prospect area. For example, the synthetic geological model may be based on available geophysical information from one or more seismic surveys and/or well data related to the prospect area. The synthetic geological model may include parameters such as velocity, density, and/or anisotropy. The synthetic geological model may include representations of local geological features.

Method 100 continues at block 113 with extraction (e.g., computation) of a reflectivity distribution from the synthetic geological model. Note that the reflectivity distribution may be used to label the features of synthetic geological model for the training that occurs later at block 120.

Method 100 continues at block 115 with forward modeling of the seismic data of the synthetic geological model. The forward-modeling operator may be wave-based to accurately describe wave-propagation phenomena.

Method 100 continues at block 117 with migration (e.g., seismic migration) of the forward-modeled data to create a migrated image. The migration may include, but is not limited to, Kirchhoff migration, WEM, and/or RTM. Note that the migrated image may be used as input for the training that occurs later at block 120.

Method 100 continues at block 120 by training a deep neural network to create a reflectivity prediction network. The reflectivity prediction network thereby learns and/or enforces relationships between the reflectivity distribution (from block 113) and the migrated image (from block 117). In some embodiments, the deep neural network is a generative adversarial network (GAN).

Figure 2:
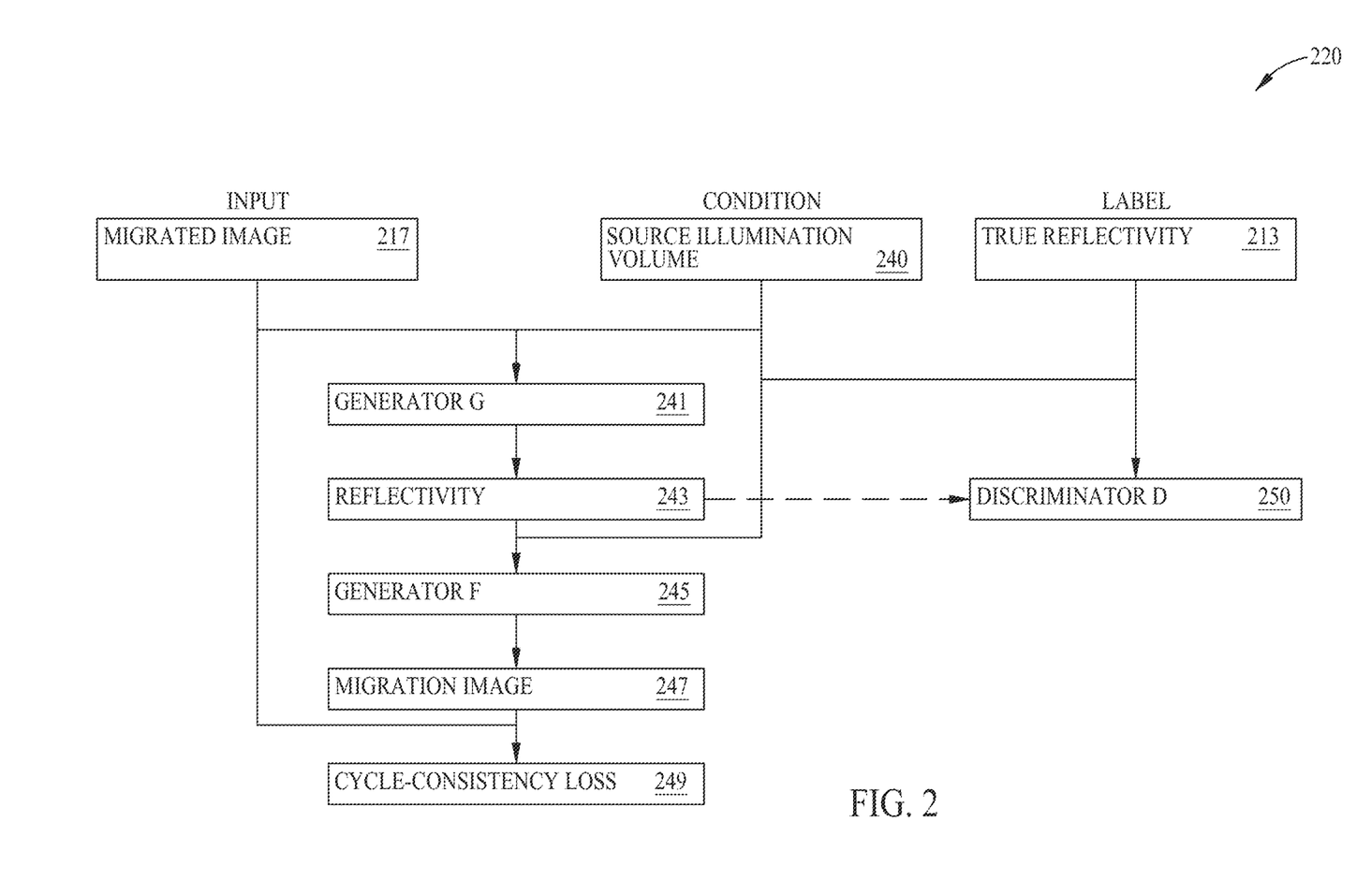
FIG. 2 illustrates an exemplary generative adversarial network (GAN) that utilizes source illumination as a conditioner. In some embodiments, the GAN of FIG. 2 may be utilized as the reflectivity prediction network of FIG. 1.

FIG. 2 illustrates an exemplary GAN 220 that utilizes source illumination as a conditioner (e.g., a Conditional Cycle-GAN). In some embodiments, the GAN 220 may be utilized as the reflectivity prediction network that is trained at block 120 of method 100. For example, if the migration at block 117 is RTM, a source illumination volume for GAN 220 may be computed as a by-product of the migration. If the migration at block 117 is not RTM, a source illumination volume for GAN 220 may be independently computed (e.g., a smoothed version of a velocity model from block 110).

As illustrated in FIG. 2, GAN 220 may include several convolutional neural networks, such as generator G 241, generator F 245, and/or discriminator D 250. Generator G 241 may be configured to generate reflectivity 243 from migrated image 217 and source illumination volume 240. Generally, the source illumination volume 240 provides geometrical spreading information, which is a wave propagation effect. Geometrical spreading information may help to encode non-stationarity into GAN 220. Here "non-stationarity" implies that the network parameter should vary based on the spatial location it is being applied to. Generator F 245 may be configured to generate migration image 247 from source illumination volume 240 and generated reflectivity 243. Discriminator D 250 may be configured to discriminate true reflectivity from generated reflectivity with source illumination volume 240 as a conditioner, based on true reflectivity 213 and generated reflectivity 243. GAN 220 may thereby learn and/or enforce the non-stationarity and the geometrical spreading information by conditioning the input migrated image 217 (e.g., the output of block 117 of FIG. 1) with the source illumination volume computed from the synthetic model (e.g., the output of block 110 of FIG. 1). GAN 220 may learn the statistical distribution associated with the migrated image 217, the source illumination volume 240, and the true reflectivity 213. GAN 220 may generate and/or store weights that represent and/or quantify the distribution.

Returning to FIG. 1, method 100 continues at block 130 with obtaining field data. In some embodiments, a seismic survey may be conducted to acquire the field data (noting that these and other embodiments may also or instead include obtaining other geophysical data in addition or, or instead of, seismic data—such as obtaining electrical resistivity measurements). In these and other embodiments, simulation models may be utilized to generate synthetic field data (e.g., computer simulation). In some embodiments, the field data may be obtained from a library of data from previous seismic surveys or previous computer simulations. In some embodiments, a combination of any two or more of these methods may be utilized to generate the field data. Note that the actions of blocks 110 and 130 may occur in parallel, sequentially, and/or in any order.

Method 100 continues at block 133 with seismic migration of the field data. The migration operator at block 133 should match that at block 117, and consequently may include, but is not limited to, Kirchhoff migration, WEM, and/or RTM.

Method 100 continues at block 135 with application of the trained reflectivity prediction network (e.g., GAN 220) to the migration imaged from block 133. Typically, application of the trained reflectivity prediction network at block 135 will use the same or similar model parameters as used when training the reflectivity prediction network at block 120.

Method 100 continues at block 137 with usage of the output from block 135 (e.g., application of the trained deep neural network to the migrated field data) serving as an initial model for LSM. For example, the output from block 135 may provide corrections to errors in the predicted model (e.g., predicted reflectivity image) by projecting data misfit into model update. LSM may then improve upon and/or correct the initial model by iteratively projecting the data misfit (e.g., the difference between modeled data from current model and field data) into model updates until the data misfit attains (e.g., falls below) a certain threshold. Utilizing LSM with the output from block 135 as an initial model may generating a corrected model. Compared with conventional LSM using a migration image as a starting model, method 100 may result in significantly fewer iterations (e.g., days, rather than months, of computing time) to achieve convergence.

Figure 3:
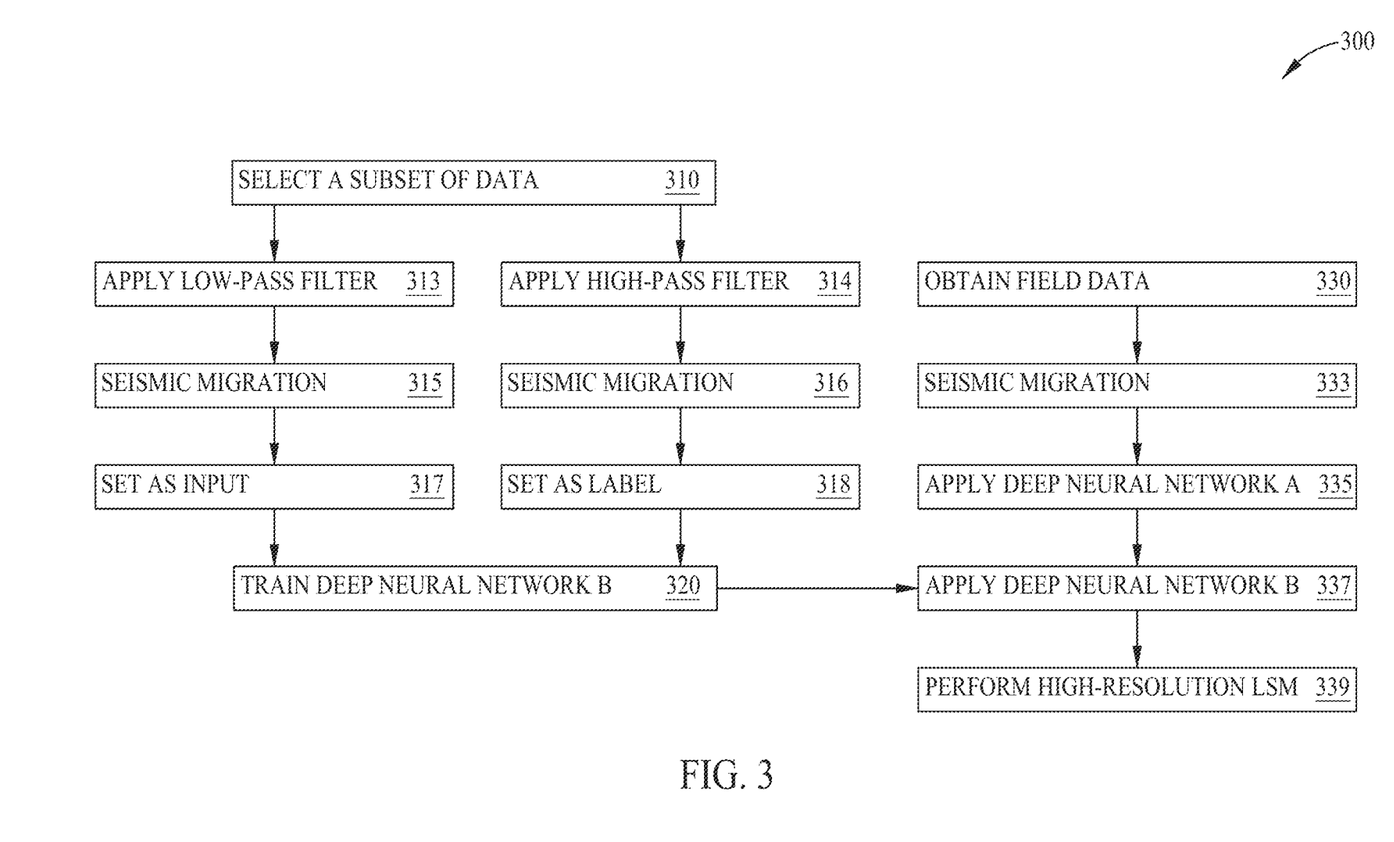
FIG. 3 illustrates an exemplary method for predicting a target distribution of high-frequency signal from an input distribution of low-frequency signal.

FIG. 3 illustrates an exemplary method 300 for generating a high-resolution seismic image by predicting a target distribution of high-frequency signal from an input distribution of low-frequency signal. The predicted high-frequency (e.g., about 40 Hz to about 80 Hz) image may be incorporated into an input low-frequency (e.g., about 20 Hz to about 40 Hz) image to improve the resolution of migrated images, while keeping intact the existing frequency band of the low-resolutions images from block 315.

Method 300 begins at block 310 with selection of a subset of data from a larger dataset. For example, the subset of data may be a subset of the field data that is also utilized at block 330. The larger dataset may be acquired survey data or synthetic data. The larger dataset may make up a survey volume.

Method 300 continues at block 313 with application of a low-pass filter to the subset of data from block 310. Method 300 continues at block 315 with migration (e.g., seismic migration) of the filtered data from block 313 to create a migrated image. The migration may include, but is not limited to, Kirchhoff migration, WEM, and/or RTM. Method 300 continues at block 317 with setting the migrated image from block 315 as input for the training that occurs later at block 320.

Method 300 continues at block 314 with application of a high-pass filter to the subset of data from block 310. Method 300 continues at block 316 with migration (e.g., seismic migration) of the filtered data from block 314 to create a migrated image. The migration operator at block 316 should match that at block 315, and consequently may include, but is not limited to, Kirchhoff migration, WEM, and/or RTM. Method 300 continues at block 318 with setting the migrated image from block 316 as a label for the training that occurs later at block 320. Note that the actions of blocks 313-317 and the actions of blocks 314-318 may occur in parallel, sequentially, and/or in any order. Note also that the data used to generate the input image of block 317 are low-pass filtered, while the data used to generate the label image of block 318 are high-pass filtered so that the output image will contain different frequency bands.

Method 300 continues at block 320 where deep neural network B is trained to predict a target distribution of high-frequency signal from an input distribution of low-frequency signal. In some embodiments, the deep neural network B may be a secondary Conditional Cycle-GAN. In some embodiments, deep neural network B may be trained with a small portion (e.g., about 10% to about 20%) of the entire survey volume using the low-frequency distribution (from block 313) and missing high-frequency distribution (from block 314).

Method 300 continues at block 330 with obtaining field data (e.g., data having a frequency band of about 5 Hz to about 100 Hz). In some embodiments, a seismic survey may be conducted to acquire the field data (noting that these and other embodiments may also or instead include obtaining other geophysical data in addition or, or instead of, seismic data-such as obtaining electrical resistivity measurements). In these and other embodiments, simulation models may be utilized to generate synthetic field data (e.g., computer simulation). In some embodiments, the field data may be obtained from a library of data from previous seismic surveys or previous computer simulations. In some embodiments, a combination of any two or more of these methods may be utilized to generate the field data. Note that the actions of blocks 310 and 330 may occur in parallel, sequentially, and/or in any order. Method 300 continues at block 333 with seismic migration of the field data. The migration operator at block 333 should match those at blocks 315 and 316, and consequently may include, but is not limited to, Kirchhoff migration, WEM, and/or RTM.

Method 300 continues at block 335 where deep neural network A is applied to the migrated images. For example, deep neural network A may be the trained reflectivity prediction network from block 135.

Method 300 continues at block 337 where deep neural network B is applied to the output of deep neural network A from block 335. For example, after deep neural network B is trained at block 320, the learned weights can be applied to the test low-resolution image volume to predict the missing high-frequency distribution for the test volume. For example, the field data may be split into training, validation, and test datasets. After training and validation, the test dataset may be used to test the performance of the trained network. In some embodiments, the predicted high-frequency distribution may be added to the low-frequency test distribution (from block 335) to output the high-frequency test distribution. Method 300 continues at block 339 with usage of the output from block 337 serving as an initial model for LSM. Note that application of the deep neural network B at block 337 may add high-frequency data points. Performing high-frequency LSM at block 339 may then verify and/or correct the added high-frequency data.

In some embodiments, the actions of blocks 335 and 337 may be combined by chaining the two deep neural networks A and B together into a single deep neural network AB. The frequency band of the predicted low-resolution reflectivity from network A may be extended to higher frequency range by network B. The output from the concatenated networks AB may provide a robust starting model for high-resolution LSM at block 339. In some embodiments, all frequency band in the predicted image can be supported in the field data. In embodiments wherein the frequency band of the predicted image exceeds the frequency band of the field data, additional steps may be taken, since the exceeded frequency band cannot be verified by the field data.

Example

Figure 4:
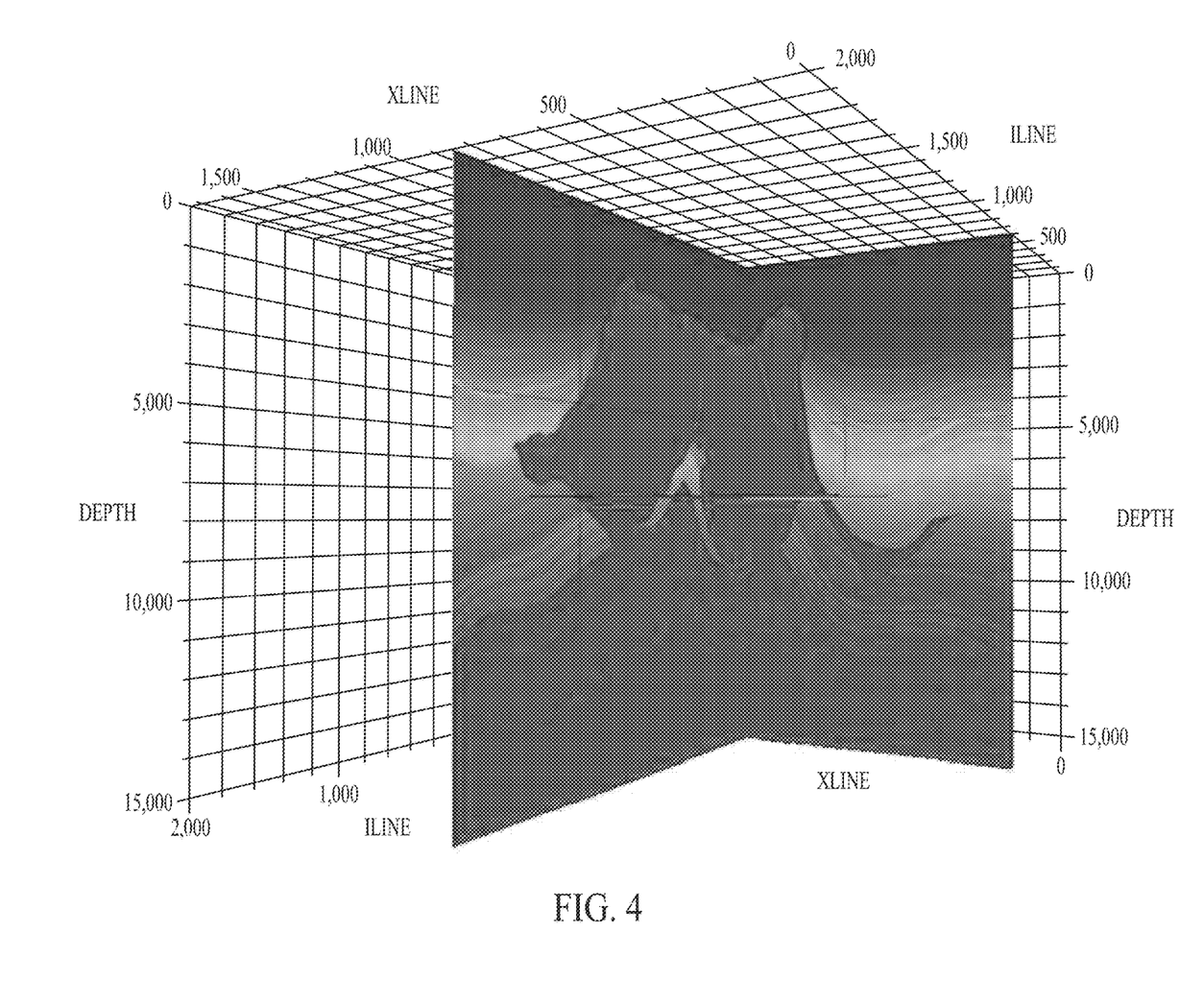
FIG. 4 illustrates a velocity model as an application example of the methods of FIGS. 1 and 3.

FIG. 4 illustrates a velocity model (specifically, a Society of Exploration Geophysicists (SEG) Advanced Modeling program model, or SEAM model) as an application example of methods 100 and 300. Method 100 may be first applied for balancing the illumination and/or removing the migration artifacts of migrated images of the SEAM model. A deep neural network is trained using several in-line slices and then tested on the remaining volume. The output using method 100 can be used as an initial model for LSM method to further balance the illumination and to accelerate the convergence of conventional LSM.

Figure 5A:
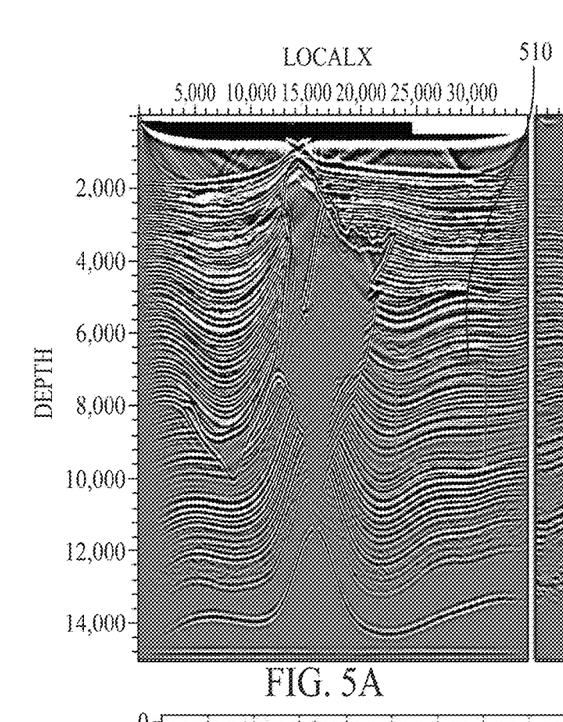
FIG. 5A illustrates a migrated image for the velocity model of FIG. 4.
Figure 5B:
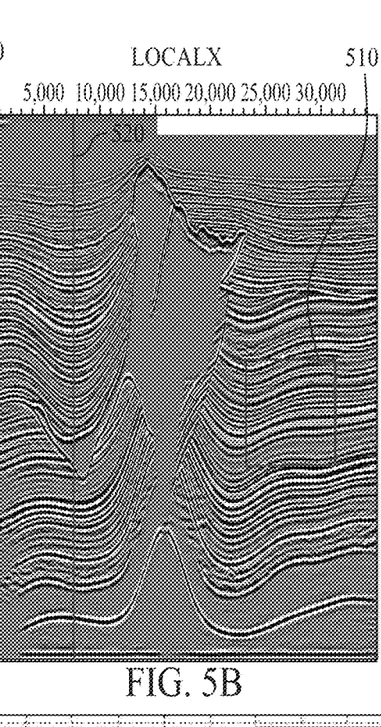
FIG. 5B illustrates output from using deep neural networks with the velocity model of FIG. 4.
Figure 5C:
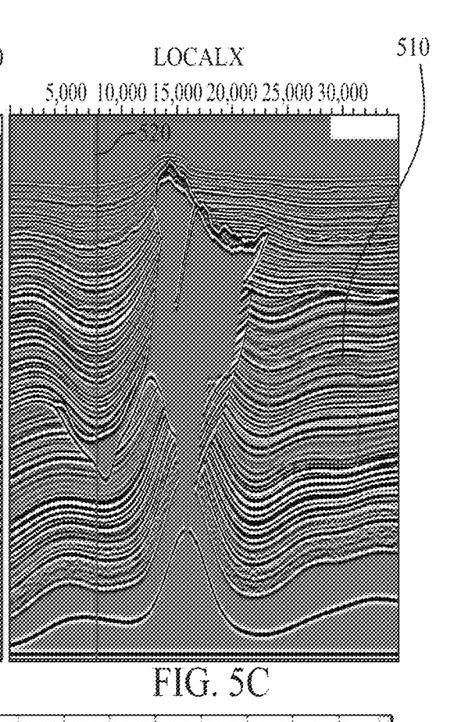
FIG. 5C illustrates the reflectivity distribution of the velocity model of FIG. 4.
Figure 5D:
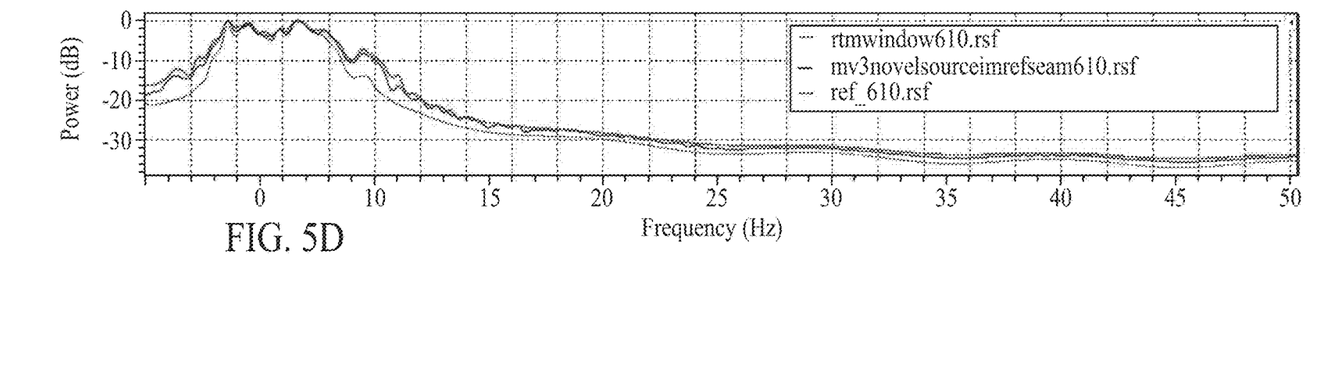
FIG. 5D illustrates the pseudo amplitude spectra of the images of FIGS. 5A-5C.

The true reflectivity of the SEAM model of FIG. 4 is illustrated in FIG. 5C. FIG. 5A illustrates a test slice with the migrated image having weaker amplitudes at deeper depths because of the uncompensated illumination loss for conventional RTM (e.g., at about 10 Hz). FIG. 5B shows the output of methods 100 and 300 applied to the test slice of FIG. 5A. Note that the results shown in FIG. 5B have better noise attenuation and more balanced amplitudes than the conventional RTM results shown in FIG. 5A (each in comparison to the true reflectivity in FIG. 5C). Also note the comparison of the pseudo amplitude spectra in FIG. 5D. (Note that the pseudo amplitude spectra has a vertical axis of the image in depth instead of time.) The spectrum using method 100 (shown in blue) is closer to the true reflectivity spectrum (shown in red) than the conventional RTM spectrum (shown in green). In each of FIGS. 5A-C, the box 510 indicates the area used for comparing the amplitude spectrum, and the line 520 indicates the selected trace for comparative analysis.

Figure 6A:
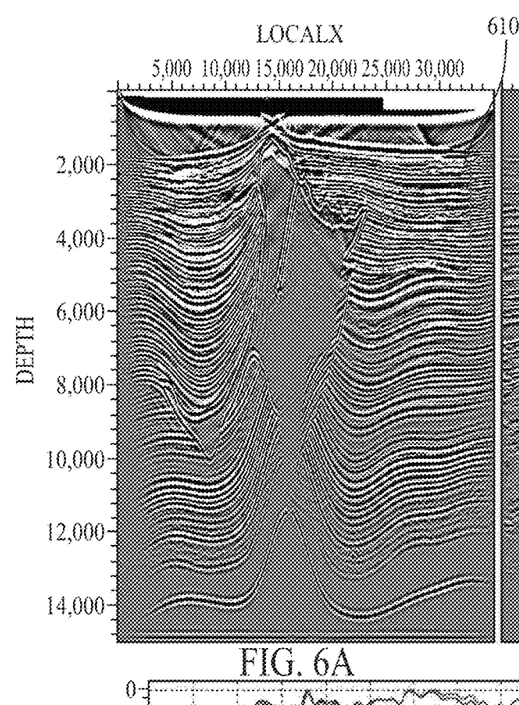
FIG. 6A illustrates another migrated image for the velocity model of FIG. 4.
Figure 6B:
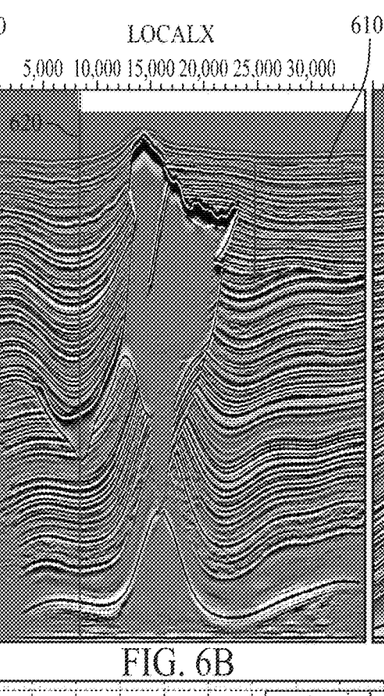
FIG. 6B illustrates another output from using deep neural networks with the velocity model of FIG. 4.
Figure 6C:
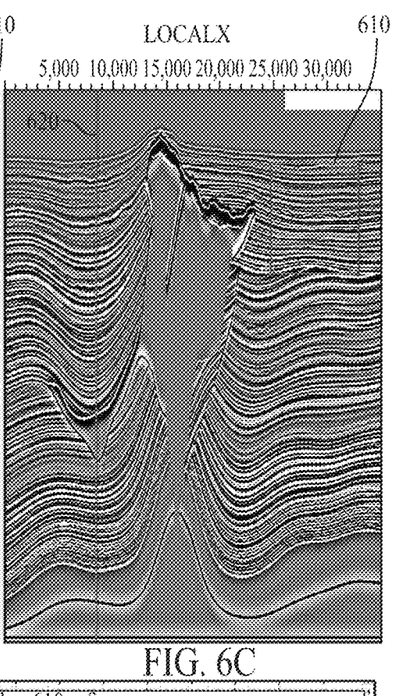
FIG. 6C illustrates another reflectivity distribution of the velocity model of FIG. 4.
Figure 6D:
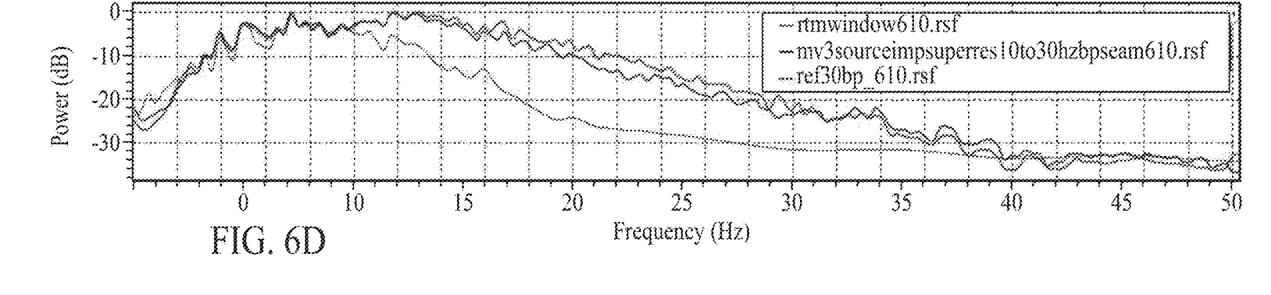
FIG. 6D illustrates the pseudo amplitude spectra of the images of FIGS. 6A-6C.

FIGS. 6A-D illustrate results of the combination of methods 100 and 300 to simultaneously balance the illumination and improve the resolution of the migrated images by incorporating high frequency information. FIG. 6A shows the RTM image (at about 10 Hz) with low resolution, uneven amplitudes, limited bandwidth and migration artifacts. The output using the combination of methods 100 and 300 is illustrated in FIG. 6B. Application of methods 100 and 300 can be seen to attenuate the migration artifacts, balance the amplitudes, and improve the resolution. The output shown in FIG. 6B can be seen to be closer to the true reflectivity of FIG. 6C (at about 30 Hz), than the output shown in FIG. 6A. FIG. 6D illustrates the pseudo amplitude spectra for the conventional RTM (shown in green), the combination of method 100 and method 300 (shown in blue), and true reflectivity (shown in red). The combination of methods 100 and 300 pose a broader spectrum as compared to conventional RTM. The amplitude spectrum of the combination of methods 100 and 300 is closer to the amplitude spectrum of the high-frequency true reflectivity model than the amplitude spectrum of conventional RTM. It is currently believed that the extension of the spectrum increases the spatial resolution of the image, which greatly facilitates interpretation. Additionally, the amplitudes are more balanced in the output image using the proposed method and are closer to the true reflectivity as shown in the comparison using an extracted trace in FIG. 6C. In each of FIGS. 6A-C, the box 610 indicates the area used for comparing the pseudo amplitude spectrum, and the line 620 indicate the selected trace for comparative analysis.

Figure 7A:
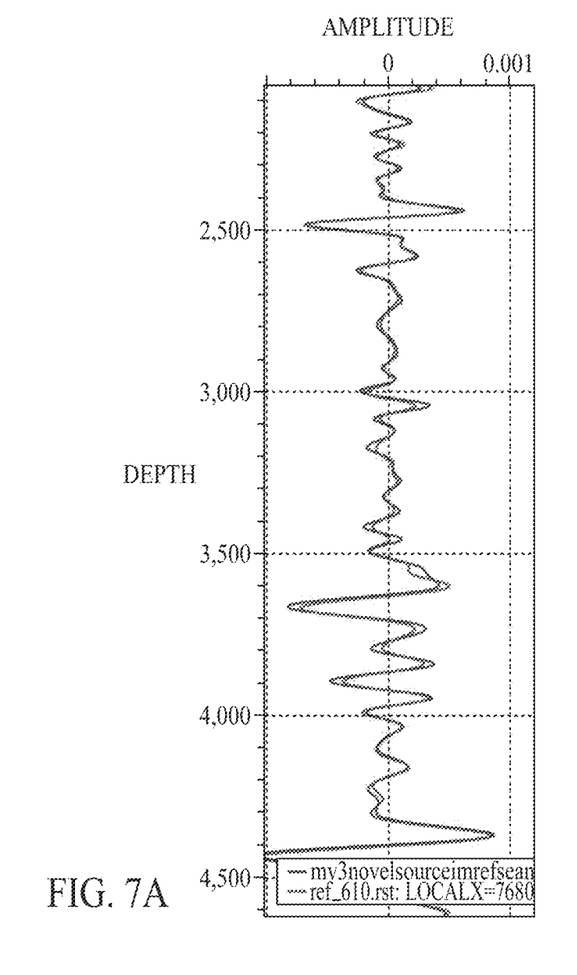
FIG. 7A illustrates an amplitude comparison for the selected trace in FIGS. 5B-5C.
Figure 7B:
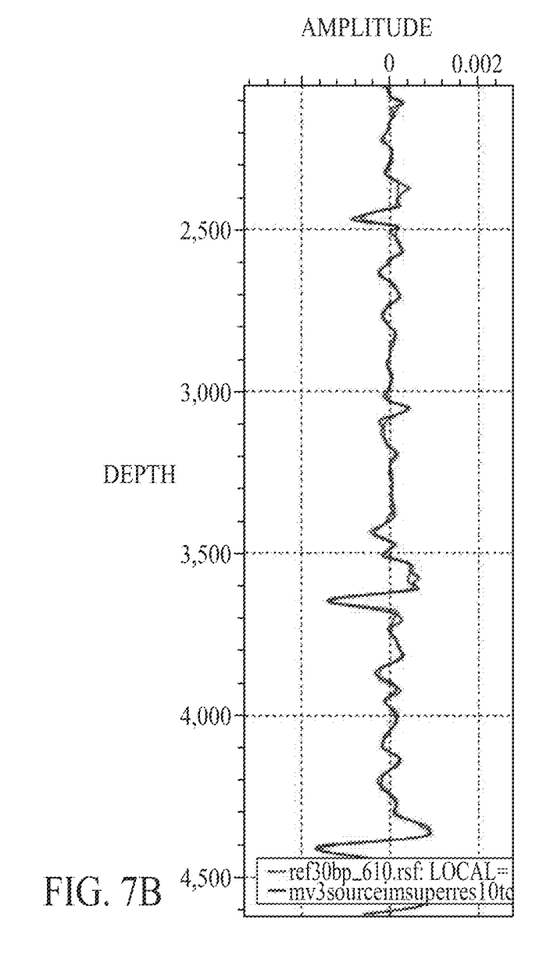
FIG. 7B illustrates an amplitude comparison for the selected trace in FIG. 6B-6C.

FIG. 7A illustrates an amplitude comparison for the selected trace in FIGS. 5B-5C. The blue trace indicates the predicted amplitudes from methods 100 and 300, and red trace indicates true amplitudes. FIG. 7B illustrates an amplitude comparison for the selected trace in FIG. 6B-6C. The blue trace indicates the predicted amplitudes from methods 100 and 300, and the red trace indicates true amplitudes.

In practical applications, the present technological advancement may be used in conjunction with a seismic data analysis system (e.g., a high-speed computer) programmed in accordance with the disclosures herein. Preferably, in order to efficiently perform inversion according to various embodiments herein, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

As will be appreciated from the above discussion, in certain embodiments of the present approach, expert inputs are elicited that will have the most impact on the efficacy of a learning algorithm employed in the analysis, such as a classification or ranking algorithm, and which may involve eliciting a judgment or evaluation of classification or rank (e.g., right or wrong, good or bad) by the reviewer with respect to a presented query. Such inputs may be incorporated in real time in the analysis of seismic data, either in a distributed or non-distributed computing framework. In certain implementations, queries to elicit such input are generated based on a seismic data set undergoing automated evaluation and the queries are sent to a workstation for an expert to review.

Figure 8:
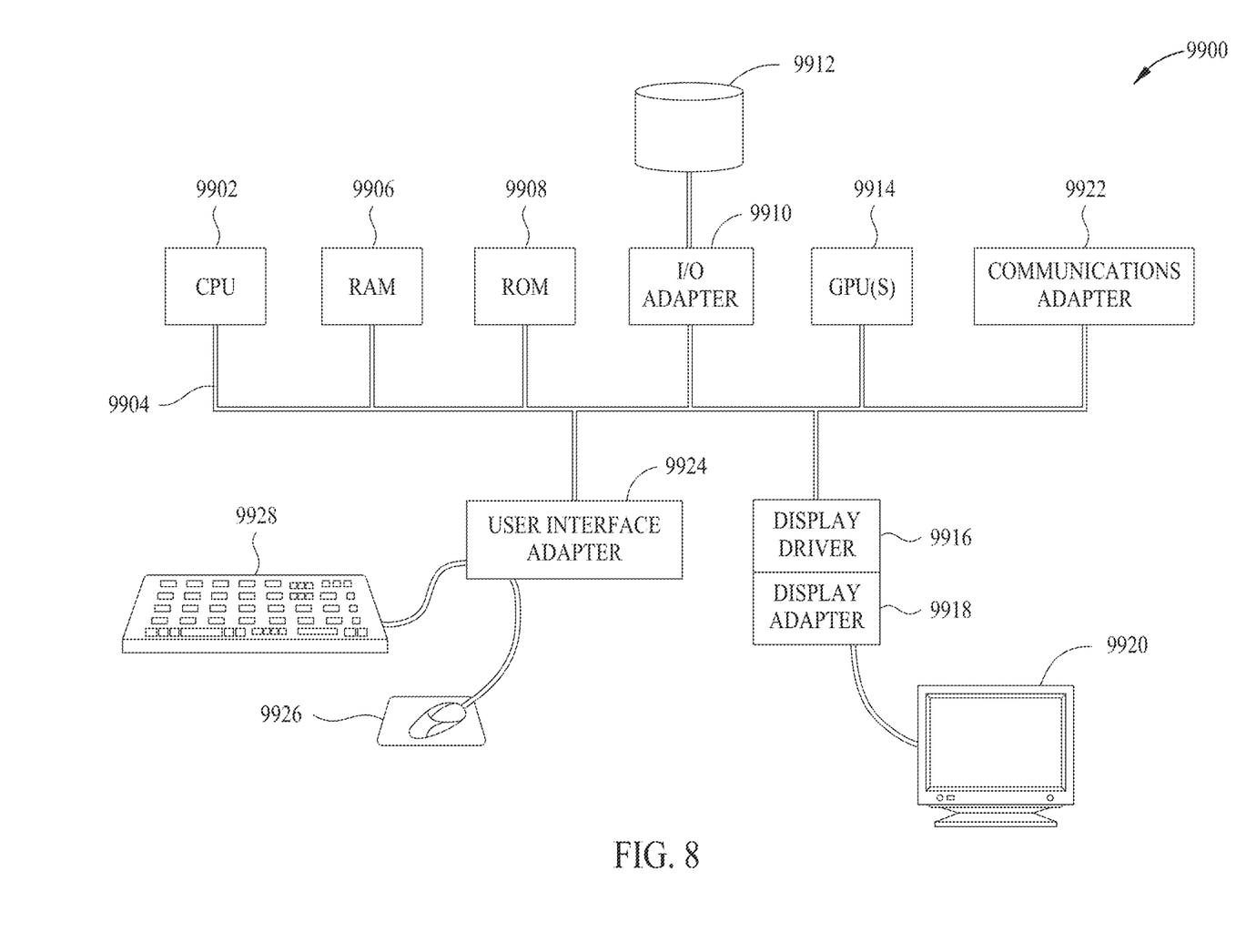
FIG. 8 illustrates a block diagram of a seismic data analysis system upon which the present technological advancement may be embodied.

FIG. 8 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 8, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein (e.g., seismic images, feature probability maps, feature objects, predicted labels of geologic features in seismic data, etc.). As the models themselves are representations of geophysical data, such a display device may also be said more generically to be configured to display graphical representations of a geophysical data set, which geophysical data set may include the models and data representations (including models and representations labeled with features predicted by a trained machine learning model) described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as deep neural networks, GANs, etc. The machine learning architectures may be trained on various training data sets, e.g., as described in connection with various methods herein. The machine learning architectures may be applied to analysis and/or problem solving related to various unanalyzed data sets (e.g., test data such as acquired seismic or other geophysical data, as described herein). It should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon high-resolution images constructed according to the above-described methods. In particular, such methods may include drilling a well, and/or causing a well to be drilled, based at least in part upon the high-resolution image (e.g., such that the well is located based at least in part upon a location determined from the high-resolution image, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

BACKGROUND REFERENCES

Claerbout, J. F., and J. L. Black, 2001, Basic earth imaging (version 2.4).
Mirza, Mehdi, and Simon Osindero. "Conditional generative adversarial nets." arXiv preprint arXiv:1411.1784 (2014).
Nemeth, T., C. Wu, and G. T. Schuster, 1999, Least-squares migration of incomplete reflection data: Geophysics, 64(1), 208-221.
Prucha, M. L., B. L. Biondi, and W. W. Symes, 1999, Angle-domain common image gathers by wave-equation migration: 69th Annual International Meeting, SEG, Expanded Abstracts, 824-827.
Rickett, J. E., 2003, Illumination-based normalization for wave-equation depth migration: Geophysics, 68(4), 1371-1379.
Wang, P., A. Gomes, Z. Zhang, and M. Wang, 2016, Least-squares RTM: Reality and possibilities for subsalt imaging: 86th Annual International Meeting, SEG, Expanded Abstracts, 4204-4209.
Xu, Zhen and Jiao, Kun and Sun, Dong and Cheng, Xin and Vigh, Denes, 2018, A cost-efficient controlled reverse time migration: 88th Annual International Meeting, SEG, Expanded Abstracts, 4286-4290.
Zhu, Jun-Yan, et al. "Unpaired image-to-image translation using cycle-consistent adversarial networks." Proceedings of the IEEE international conference on computer vision. 2017.

What is claimed is:

1. A method of generating a high-resolution seismic image, comprising:
creating a synthetic geological model;
extracting a reflectivity distribution from the synthetic geological model;
utilizing the reflectivity distribution to label one or more features of the synthetic geological model;
generating forward-modeled data from the synthetic geological model;
migrating the forward-modeled data to create a migrated image; and
training a deep neural network with the labeled synthetic geological model and the migrated image to create a reflectivity prediction network that maps an input migrated image to an estimate of true reflectivity.

2. The method of claim 1, wherein the synthetic geological model comprises at least one parameter type selected from a group of parameter types consisting of:
velocity;
density; and
anisotropy.

3. The method of claim 1, wherein the forward-modeled data is generated with a forward operator that is wave-based.

4. The method of claim 1, wherein the migrating comprising at least one of: Kirchhoff migration, Wave Equation Migration, and Reverse Time Migration.

5. The method of claim 1, wherein the reflectivity prediction network comprises a conditional cycle-generative adversarial network.

6. The method of claim 5, further comprising:
computing a source illumination volume; and
utilizing the source illumination volume as a conditioner of the conditional cycle-generative adversarial network.

7. The method of claim 1, further comprising applying the reflectivity prediction network to migrated field data to generate an initial model.

8. The method of claim 7, further comprising utilizing the initial model with least-squares migration to correct for errors in the initial model, thereby generating a corrected model.

9. The method of claim 8, further comprising managing hydrocarbons based on the corrected model.

10. The method of claim 8, wherein the least-squares migration comprises least-squares reverse-time migration.

11. A method of generating a high-resolution seismic image, comprising:
obtaining field data;
selecting a first subset of the field data;
applying a low-pass filter to the first subset to generate a first filtered dataset;
migrating the first filtered dataset to create a first migrated image;
applying a high-pass filter to the first subset to generate a second filtered dataset;
migrating the second filtered dataset to create a second migrated image; and
training a deep neural network to predict a target distribution of high-frequency signal by mapping the first migrated image to the second migrated image.

12. The method of claim 11, wherein the migrating comprising at least one of: Kirchhoff migration, Wave Equation Migration, and Reverse Time Migration.

13. The method of claim 11, wherein the deep neural network comprises a conditional cycle-generative adversarial network.

14. The method of claim 11, further comprising:
selecting a second subset of the field data;
migrating the second subset to create a third migrated image; and
applying a reflectivity prediction network to the third migrated image to generate a reflectivity model.

15. The method of claim 14, wherein the reflectivity prediction network maps an input migrated image to an estimate of true reflectivity and is created by:
creating a synthetic geological model;
extracting a reflectivity distribution from the synthetic geological model;
utilizing the reflectivity distribution to label one or more features of the synthetic geological model;
generating forward-modeled data from the synthetic geological model;
migrating the forward-modeled data to create a fourth migrated image; and
training a deep neural network with the labeled synthetic geological model and the fourth migrated image to create the reflectivity prediction network.

16. The method of claim 14, further comprising: applying the deep neural network to the reflectivity model to generate an initial model.

17. The method of claim 16, further comprising utilizing the initial model with least-squares migration to correct for errors in the initial model, thereby generating a corrected model.

18. The method of claim 17, further comprising managing hydrocarbons based on the corrected model.

19. The method of claim 17, wherein the least-squares migration comprises least-squares reverse-time migration.

20. The method of claim 19, further comprising performing a subsequent high-resolution least-squares migration.

* * * * *